(12) United States Patent
Li et al.

(10) Patent No.: US 11,913,913 B2
(45) Date of Patent: Feb. 27, 2024

(54) STRUCTURE MULTI-DIMENSIONAL LOADING TEST SYSTEM CONSIDERING REAL COMPLEX BOUNDARY CONDITIONS

(71) Applicant: DALIAN UNIVERSITY OF TECHNOLOGY, Liaoning (CN)

(72) Inventors: Hongnan Li, Liaoning (CN); Linsheng Huo, Liaoning (CN); Gang Li, Liaoning (CN); Jing Zhou, Liaoning (CN); Zhuodong Yang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 2 days.

(21) Appl. No.: 17/617,867

(22) PCT Filed: Jun. 30, 2021

(86) PCT No.: PCT/CN2021/103345
§ 371 (c)(1),
(2) Date: Dec. 9, 2021

(87) PCT Pub. No.: WO2022/147979
PCT Pub. Date: Jul. 14, 2022

(65) Prior Publication Data
US 2023/0058314 A1     Feb. 23, 2023

(30) Foreign Application Priority Data

Jan. 11, 2021 (CN) .......................... 202110040160.9

(51) Int. Cl.
*G01M 7/02* (2006.01)
*G01N 3/10* (2006.01)
*G01N 3/04* (2006.01)

(52) U.S. Cl.
CPC ................ *G01N 3/10* (2013.01); *G01M 7/02* (2013.01); *G01N 3/04* (2013.01)

(58) Field of Classification Search
CPC ........... G01M 7/02; G01M 7/022; G01M 7/06
(Continued)

(56) References Cited

U.S. PATENT DOCUMENTS 4,011,749 A * 3/1977 Cappel .................... G01M 7/06
  73/665
4,436,188 A * 3/1984 Jones ...................... B23Q 1/48
  403/57

(Continued)

FOREIGN PATENT DOCUMENTS

CN   102279124 A   12/2011
CN   104215465 A   12/2014
(Continued)

*Primary Examiner* — David A. Rogers
(74) *Attorney, Agent, or Firm* — Muncy, Geissler, Olds & Lowe, P.C.

(57) ABSTRACT

A structure multi-dimensional loading test system considering real complex boundary conditions considering real complex boundary conditions comprises a main part of machine, a base part, a hydraulic power supply and a control system. The system can simulate the load borne by a structure in a real working environment better and more accurately, realize multi-dimensional loading of the structure with six degrees of freedom in space and provide more real and valuable experimental data for the research on damage of reinforced concrete materials, components and structures under the action of an earthquake, and the research results will help researchers further reveal the damage mechanism of reinforced concrete structures, put forward the corresponding damage criteria and develop the corresponding seismic design methods.

1 Claim, 2 Drawing Sheets

(58) Field of Classification Search
USPC .......... 73/577, 662, 663, 802, 803, 804, 856
See application file for complete search history.

(56) References Cited

U.S. PATENT DOCUMENTS

| | | | | |
|---|---|---|---|---|
| 4,446,742 | A * | 5/1984 | Thompson, Jr. .......... | B06B 1/10 73/665 |
| 4,602,555 | A * | 7/1986 | Bushey .................... | G01M 7/06 92/DIG. 1 |
| 4,658,656 | A * | 4/1987 | Haeg .................... | G01M 17/007 73/669 |
| 5,291,787 | A * | 3/1994 | Laforest .................. | G01M 7/06 73/663 |
| 5,545,040 | A * | 8/1996 | Lu ............................ | G09B 9/02 434/58 |
| 5,724,893 | A * | 3/1998 | Lee ........................ | G01M 7/06 74/490.09 |
| 5,752,834 | A * | 5/1998 | Ling ........................ | G09B 9/12 434/58 |
| 6,220,100 | B1 * | 4/2001 | Felkins ................. | G01M 7/022 73/663 |
| 7,267,010 | B2 * | 9/2007 | Lund ....................... | G01M 7/04 73/663 |
| 8,485,048 | B2 * | 7/2013 | Bushey ............... | G01M 13/027 73/862.08 |
| 9,010,188 | B2 * | 4/2015 | Tustaniwskyj ........ | G01M 7/022 73/662 |
| 9,551,639 | B2 * | 1/2017 | Li ............................ | G01N 3/08 |
| 9,638,602 | B2 * | 5/2017 | Gibson ................. | G01M 7/027 |
| 9,666,093 | B2 * | 5/2017 | In ........................ | G01M 17/007 |
| 9,863,839 | B2 * | 1/2018 | Proulx .................. | G01M 7/025 |
| 10,422,717 | B2 * | 9/2019 | He ............................ | G01H 1/12 |
| 11,248,987 | B2 * | 2/2022 | Han ...................... | G01M 7/022 |
| 11,460,370 | B2 * | 10/2022 | Connolly ............... | G01M 7/06 |
| 11,726,019 | B2 * | 8/2023 | Huo ...................... | F16F 9/3292 73/54.41 |
| 11,781,941 | B2 * | 10/2023 | Sturm .................. | G01M 17/06 73/117.02 |
| 2003/0200811 | A1 * | 10/2003 | Woyski ................. | G01M 7/06 73/663 |
| 2015/0323414 | A1 * | 11/2015 | In ........................ | G01M 17/007 73/11.07 |
| 2016/0054211 | A1 * | 2/2016 | Li ............................ | G01N 3/08 73/818 |
| 2018/0321111 | A1 * | 11/2018 | Matsumoto ........... | G01M 7/027 |
| 2021/0223149 | A1 * | 7/2021 | Tan .......................... | G01N 3/12 |

FOREIGN PATENT DOCUMENTS

| | | | | |
|---|---|---|---|---|
| CN | 105223076 | A | | 1/2016 |
| CN | 108956077 | A * | 12/2018 | ............. G01M 7/06 |
| CN | 109406123 | A | | 3/2019 |
| CN | 109406312 | B * | 3/2021 | ............. G01N 29/07 |
| CN | 112730032 | A | | 4/2021 |
| CN | 114414186 | A * | 4/2022 | |
| JP | H03118442 | A | | 5/1991 |

* cited by examiner

STRUCTURE MULTI-DIMENSIONAL LOADING TEST SYSTEM CONSIDERING REAL COMPLEX BOUNDARY CONDITIONS

TECHNICAL FIELD

The present invention relates to a structure multi-dimensional loading test system considering real complex boundary conditions, and belongs to the technical field of civil engineering test devices.

BACKGROUND

The damage and collapse of engineering structures in an earthquake is the main cause of economic losses and casualties. It is of great significance to reveal the earthquake damage mechanism of engineering structures and put forward effective seismic design methods to reduce the seismic response of structures and ensure the safety of people's lives and property. Due to the complexity of the earthquake mechanism and the seismic performance of structures, people have to carry out seismic model tests to supplement the theoretical analysis. However, in the existing seismic model tests, the stress state of structures or components is significantly different from the actual situation. The problem of serious scale effect caused by model scale exists in seismic test methods of structural models, but multi-dimensional loading and real complex boundary conditions in an earthquake cannot be simulated to study and describe component tests of failure modes and damage mechanisms in detail. Therefore, a seismic experiment device capable of simulating more real complex stress states of structures is needed to further reveal the damage mechanism of engineering structures under the action of an earthquake, put forward more effective structure damage criteria and form a feasible seismic design method to ensure the safety of engineering structures in strong earthquakes.

SUMMARY

To overcome the defects in the prior art, the present invention provides a multi-dimensional dynamic loading seismic experiment device capable of simulating real complex boundary conditions of structures.

The present invention has the following technical solution:

The main part of machine comprises two horizontal components and a vertical component which realize multi-dimensional dynamic loading of a test piece in upward, downward, leftward, rightward, forward and backward directions; the two horizontal components are perpendicular to each other, and have the same composition and working principle; each horizontal component comprises two reaction blocks 4, two complex boundary condition actuating systems 5, four guide screws 6, two electric machines 7, eight screw rings 8, eight tensioners 11, two guide rails 2, four wheel components 3 and chains 10, wherein the outer side of each reaction block 4 is fixed with one electric machine 7, four screw rings 8 and four tensioners 11, and the inner side is fixed with one complex boundary condition actuating system 5; both ends of each guide screw 6 vertically penetrate the two opposite reaction blocks 4 respectively, and are connected with the reaction blocks 4 through the screw rings 8; the guide rails 2 are fixed on a base 1, and the reaction blocks 4 are connected with the guide rails 2 through the wheel components 3; each electric machine 7 is connected with the four screw rings 8 and the four tensioners 11 on the same side through the drive chains 10; when working, the electric machines 7 drive the tensioners 11 to rotate, and then drive the four screw rings 8 through the chains 10 to rotate, so as to drive the reaction blocks 4 to move along the guide rails 2 to adjust the test space and the positions of the complex boundary condition actuating systems 5; the vertical component comprises a reaction block 4, an electric machine 7, four screw rings 8, four tensioners 11, four guide screws 6, two complex boundary condition actuating systems 5 and chains 10, wherein the outer side of the reaction block 4 is fixed with one electric machine 7, four screw rings 8 and four tensioners 11, the inner side is fixed with one complex boundary condition actuating system 5, and the other complex boundary condition actuating system 5 is fixed on the base 1; one end of each guide screw 6 is fixed on the base 1, the other end vertically penetrates the reaction block 4 and is connected with the reaction block 4 through the screw rings 8, and the electric machine 7 is connected with the four screw rings 8 and the four tensioners 11 on the same side through the drive chains 10; and when working, the electric machine 7 drives the tensioners 11 to rotate, and then drives the four screw rings 8 through the chains 10 to rotate, so as to drive the reaction block 4 to move along the vertical direction to adjust the test space and the complex boundary condition actuating systems 5;

The complex boundary condition actuating systems realize simulation of the boundary load with six degrees of freedom, that is, six degrees of freedom of respectively moving along X, Y and Z directions and respectively rotating around X, Y and Z directions; each complex boundary condition actuating system comprises seven actuators, a machine frame 12 and an end motion platform 16, wherein the seven actuators are two X-directional actuators 13, a Y-directional actuator 14 and four Z-directional actuators 15; and when working, the seven actuators carry out coordinated motion loading, support the end motion platform 16 and realize application of tension, compression, bending, shear and torsion loads or a combination thereof to a test piece 9;

Each actuator comprises two mechanical universal joints 17 and a servo hydraulic cylinder 18; the servo hydraulic cylinder 18 is arranged between the two mechanical universal joints 17; the actuators are fixed to the machine frame 12 and the end motion platform 16 respectively in different directions, with each actuator fixed by the two mechanical universal joints; and a hydraulic power supply provides hydraulic power for the servo hydraulic cylinder 18 under the control of a control system.

The present invention has the following beneficial effects: the structure multi-dimensional loading test system considering real complex boundary conditions proposed by the present invention is a novel multi-dimensional dynamic loading test system with six degrees of freedom; compared with the prior art, the system can simulate the load borne by a structure in a real working environment better and more accurately, realize multi-dimensional dynamic loading of the structure with six degrees of freedom in space and provide more real and valuable experimental data for the research on damage of reinforced concrete materials, components and structures under the action of an earthquake; and the research results will help researchers further reveal the damage mechanism of reinforced concrete structures, put forward the corresponding damage criteria and develop the corresponding seismic design methods.

In the figures, 1: base, 2: guide rail, 3: wheel component, 4: reaction block, 6: complex boundary condition actuating system, 6: guide screw, 7: electric machine, 8: screw ring, 9: test piece, 10: chain, 11: tensioner, 12: machine frame, 13: X-directional actuator, 14: Y-directional actuator, 15: Z-directional actuator, 16: end motion platform, 17: mechanical universal joint, and 18: servo hydraulic cylinder.

DETAILED DESCRIPTION

The present invention will be further described in detail below in combination with specific embodiments.

The present invention provides a structure multi-dimensional loading test system considering real complex boundary conditions, comprising a main part of machine, a base part, a hydraulic power supply (which belongs to the prior art and will not be repeated herein) and a control system (which belongs to the prior art and will not be repeated herein), wherein the main part of machine is the core of the system.

Figure 1:
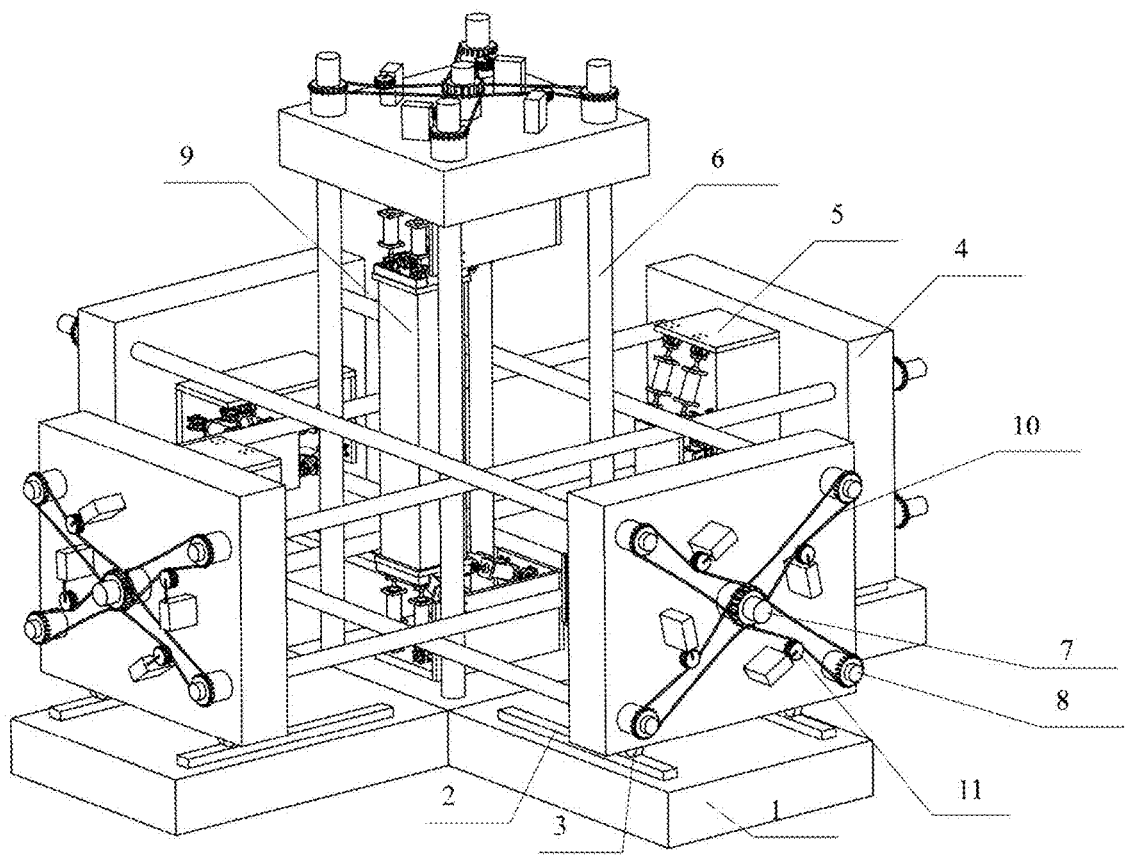
FIG. 1 is an experimental schematic diagram of a structure multi-dimensional loading test system considering real complex boundary conditions of the present invention.

With reference to FIG. 1, the main part of machine comprises two horizontal components and a vertical component which realize multi-dimensional dynamic loading of a test piece in upward, downward, leftward, rightward, forward and backward directions; the two horizontal components are perpendicular to each other, and have the same composition and working principle; each horizontal component comprises two reaction blocks 4, two complex boundary condition actuating systems 5, four guide screws 6, two electric machines 7, eight screw rings 8, eight tensioners 11, two guide rails 2, four wheel components 3 and chains 10, wherein the outer side of each reaction block 4 is fixed with one electric machine 7, four screw rings 8 and four tensioners 11, the inner side is fixed with one complex boundary condition actuating system 5, each guide screw 6 vertically penetrates the two reaction blocks 4 and are connected with the reaction blocks 4 through the screw rings 8, the guide rails 2 are fixed on a base 1, the reaction blocks 4 are connected with the guide rails 2 through the wheel components 3, and each electric machine 7 is connected with the four screw rings 8 and the four tensioners 11 on the same side through the drive chains 10; when working, the electric machines 7 drive the tensioners to rotate, and then drive the four screw rings 8 through the chains 10 to rotate, so as to drive the reaction blocks 4 to move along the guide rails 2 to achieve the purpose of adjusting the test space and the positions of the complex boundary condition actuating systems; the vertical component comprises a reaction block, an electric machine, four screw rings, four tensioners, four guide screws, two complex boundary condition actuating systems and chains, wherein the outer side of the reaction block is fixed with one electric machine, four screw rings and four tensioners, the inner side is fixed with one complex boundary condition actuating system, the other complex boundary condition actuating system is fixed on the base, one end of each guide screw is fixed on the base, the other end vertically penetrates the reaction block and is connected with the reaction block through the screw rings, and the electric machine is connected with the four screw rings and the four tensioners on the same side through the drive chains; and when working, the electric machine drives the tensioners to rotate, and then drives the four screw rings through the chains to rotate, so as to drive the reaction block to move along the vertical direction to achieve the purpose of adjusting the test space and the positions of the complex boundary condition actuating systems.

Figure 2:
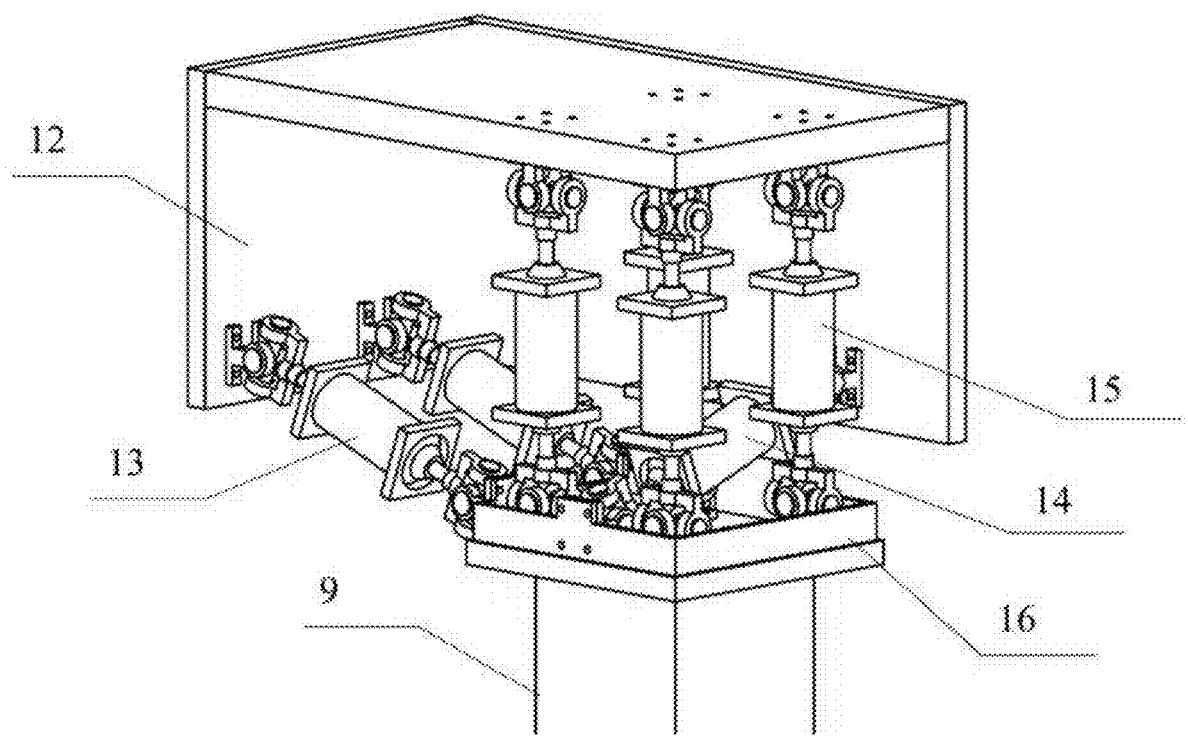
FIG. 2 is a schematic diagram of a complex boundary condition actuating system.

With reference to FIG. 2, the complex boundary condition actuating systems can realize simulation of the boundary load with six degrees of freedom, that is, six degrees of freedom of respectively moving along X, Y and Z directions and respectively rotating around X, Y and Z directions; each complex boundary condition actuating system comprises seven actuators, a machine frame 12 and an end motion platform 16, wherein the seven actuators are two X-directional actuators 13, a Y-directional actuator 14 and four Z-directional actuators 15; and when working, the seven actuators carry out coordinated motion loading, support the end motion platform 16 and realize application of tension, compression, bending, shear and torsion loads or a combination thereof to a test piece 9.

Figure 3:
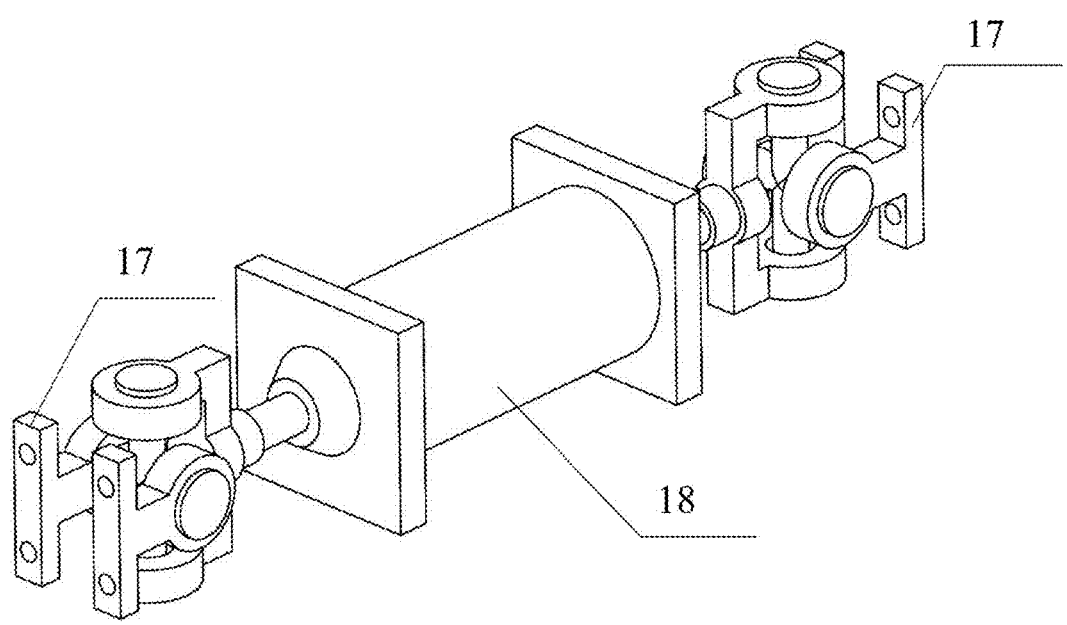
FIG. 3 is a schematic diagram of an actuator.

With reference to FIG. 3, each actuator comprises two mechanical universal joints 17 and a servo hydraulic cylinder 18; the servo hydraulic cylinder 18 is arranged between the two mechanical universal joints 17 which can rotate in any direction; the actuators are fixed to the machine frame 12 and the end motion platform 16 respectively in different directions, with each actuator fixed by the two mechanical universal joints; and a hydraulic power supply provides hydraulic power for the servo hydraulic cylinder 18 under the control of a control system.

A test method for the structure multi-dimensional loading test system considering real complex boundary conditions is as follows:

With reference to FIG. 1, when being tested by the structure multi-dimensional loading test system considering real complex boundary conditions, the test piece 9 is placed in a suitable test space by moving the reaction blocks, and both ends of the test piece 9 are connected with the end motion platforms 16 of the two complex boundary condition actuating systems 5 of the vertical component; and when the actuators carry out motion loading, the load generated is applied to the test piece 9 through the end motion platforms 16, which simultaneously generates movement along three axes and rotation around three axes at the boundary of the test piece 9, and the load on the boundary of the test piece 9 will change in response to the change of the actuator load, thus realizing coordinated loading with six degrees of freedom and simulating the load on the boundary of the structure. Therefore, more real and accurate mechanical property test data can be obtained, which lays a foundation for further study of researchers.

The part not described in the present invention can be realized by adopting or referring to the prior art.

The present invention is not limited to the above optimal embodiments. Anyone can derive other forms of structure multi-dimensional static/dynamic loading test systems considering real complex boundary conditions under the enlightenment of the present invention. All equal variations and modifications made in accordance with the scope of the application patent of the present invention shall belong to the scope covered by the present invention.

The invention claimed is:
1. A structure multi-dimensional loading test system considering real complex boundary conditions, comprising:
a main part of machine,
a base part,
a hydraulic power supply; and
a control system, wherein the main part of machine is the core of the system;
wherein the main part of machine comprises two horizontal components perpendicular to each other and a vertical component which realize multi-dimensional loading of a test piece in upward, downward, leftward, rightward, forward and backward directions; the two horizontal components perpendicular to each other have the same composition and working principle; each horizontal component comprises two reaction blocks, two complex boundary condition actuating systems, four guide screws, two electric machines, eight screw rings, eight tensioners, two guide rails, four wheel components and chains, wherein the outer side of each reaction block is fixed with one electric machine, four screw rings and four tensioners, and the inner side is fixed with one complex boundary condition actuating system; both ends of each guide screw vertically penetrate the two opposite reaction blocks respectively, and are connected with the reaction blocks through the screw rings; the guide rails are fixed on a base, and the reaction blocks are connected with the guide rails through the wheel components; each electric machine is connected with the four screw rings and the four tensioners on the same side through the drive chains; when working, the electric machines drive the tensioners to rotate, and then drive the four screw rings through the chains to rotate, so as to drive the reaction blocks to move along the guide rails to adjust the test space and the positions of the complex boundary condition actuating systems; the vertical component comprises a reaction block, an electric machine, four screw rings, four tensioners, four guide screws, two complex boundary condition actuating systems and chains, wherein the outer side of the reaction block is fixed with one electric machine, four screw rings and four tensioners, the inner side is fixed with one complex boundary condition actuating system, and the other complex boundary condition actuating system is fixed on the base; one end of each guide screw is fixed on the base, the other end vertically penetrates the reaction block and is connected with the reaction block through the screw rings, and the electric machine is connected with the four screw rings and the four tensioners on the same side through the drive chains; and when working, the electric machine drives the tensioners to rotate, and then drives the four screw rings through the chains to rotate, so as to drive the reaction block to move along the vertical direction to adjust the test space and the complex boundary condition actuating systems;
wherein the complex boundary condition actuating systems realize simulation of the boundary load with six degrees of freedom, that is, six degrees of freedom of respectively moving along X, Y and Z directions and respectively rotating around X, Y and Z directions; each complex boundary condition actuating system comprises seven actuators, a machine frame and an end motion platform, wherein the seven actuators are two X-directional actuators, a Y-directional actuator and four Z-directional actuators; and when working, the seven actuators carry out coordinated motion loading, support the end motion platform and realize application of tension, compression, bending, shear and torsion loads or a combination thereof to a test piece;
wherein each actuator comprises two mechanical universal joints and a servo hydraulic cylinder; the servo hydraulic cylinder is arranged between the two mechanical universal joints; the actuators are fixed to the machine frame and the end motion platform respectively in different directions, with each actuator fixed by the two mechanical universal joints; and a hydraulic power supply provides hydraulic power for the servo hydraulic cylinder under the control of a control system.

* * * * *